United States Patent
Yu et al.

(10) Patent No.: US 10,015,162 B2
(45) Date of Patent: Jul. 3, 2018

(54) FIREWALL AUTHENTICATION OF CONTROLLER-GENERATED INTERNET CONTROL MESSAGE PROTOCOL (ICMP) ECHO REQUESTS

(71) Applicant: Huawei Technologies Co., Ltd., Shenzhen (CN)

(72) Inventors: Yinfeng Yu, Ottawa (CA); Mehdi Arashmid Akhavain Mohammadi, Ottawa (CA); Tao Wan, Ottawa (CA); Guoli Yin, Ottawa (CA); Xingjun Chu, Ottawa (CA); Khaldoon Al Zoubi, Kanata (CA); Yapeng Wu, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 108 days.

(21) Appl. No.: 14/709,180

(22) Filed: May 11, 2015

(65) Prior Publication Data

US 2016/0337314 A1 Nov. 17, 2016

(51) Int. Cl.
*H04L 29/06* (2006.01)
(52) U.S. Cl.
CPC ........ *H04L 63/083* (2013.01); *H04L 63/0227* (2013.01); *H04L 63/0236* (2013.01)
(58) Field of Classification Search
CPC ............... H04L 63/0236; H04L 63/083; H04L 29/06557; H04L 63/02; H04L 63/0227
USPC .......................................................... 726/11
See application file for complete search history.

(56) References Cited

U.S. PATENT DOCUMENTS

| | | | | | |
|---|---|---|---|---|---|
| 5,828,833 | A | * | 10/1998 | Belville | G06F 9/547 726/11 |
| 6,163,843 | A | * | 12/2000 | Inoue | H04L 63/0227 709/225 |
| 6,182,226 | B1 | * | 1/2001 | Reid | H04L 29/06 709/225 |
| 6,507,869 | B1 | * | 1/2003 | Franke | H04L 29/12018 709/220 |

(Continued)

FOREIGN PATENT DOCUMENTS

| CN | 102231748 A | 11/2011 |
|---|---|---|
| CN | 102763368 A | 10/2012 |

(Continued)

OTHER PUBLICATIONS

Wikipedia, "Internet Control Message Protocol", https://en.wikipedia.org/wiki/Internet_Control_Message_Protocol , Dec. 30, 2014, Wikipedia, 10 pages.*

(Continued)

*Primary Examiner* — Eleni A Shiferaw
*Assistant Examiner* — Shahriar Zarrineh
(74) *Attorney, Agent, or Firm* — Slater Matsil, LLP

(57) ABSTRACT

A method implemented by a network firewall, comprising obtaining a first authentication token for a network test, receiving a test request message for performing the network test on a network element (NE) connected to the network firewall, authenticating the test request message by determining whether the test request message includes a second authentication token that matches the first authentication token, and granting the network test on the NE when the second authentication token matches the first authentication token.

21 Claims, 10 Drawing Sheets

(56) References Cited

U.S. PATENT DOCUMENTS

| | | | | |
|---|---|---|---|---|
| 6,775,704 | B1* | 8/2004 | Watson | G06F 9/547 709/229 |
| 6,901,075 | B1* | 5/2005 | Baron | H04L 69/08 370/392 |
| 7,055,173 | B1* | 5/2006 | Chaganty | H04L 41/0654 726/11 |
| 7,215,637 | B1* | 5/2007 | Ferguson | H04L 45/00 370/230.1 |
| 7,506,054 | B1* | 3/2009 | Fuh | H04L 63/0227 709/225 |
| 7,568,092 | B1* | 7/2009 | Englund | H04L 63/102 380/255 |
| 7,730,527 | B2* | 6/2010 | Charles | H04L 63/0807 726/11 |
| 7,945,656 | B1* | 5/2011 | Remaker | H04L 29/12028 370/289 |
| 8,776,202 | B2* | 7/2014 | Ravindranath | H04L 61/2575 380/257 |
| 9,787,559 | B1* | 10/2017 | Schroeder | H04L 43/067 |
| 2003/0046577 | A1* | 3/2003 | Silverman | H04L 41/12 726/23 |
| 2003/0051155 | A1* | 3/2003 | Martin | H04L 63/029 726/11 |
| 2003/0172145 | A1 | 9/2003 | Nguyen | |
| 2004/0017814 | A1* | 1/2004 | Shimada | H04L 29/1232 370/395.52 |
| 2004/0066764 | A1* | 4/2004 | Koodli | H04L 47/14 370/331 |
| 2004/0255156 | A1* | 12/2004 | Chan | H04L 29/06027 726/11 |
| 2005/0089016 | A1 | 4/2005 | Zhang et al. | |
| 2005/0154733 | A1* | 7/2005 | Meltzer | H04L 63/1416 |
| 2005/0207410 | A1* | 9/2005 | Adhikari | H04L 12/4633 370/389 |
| 2005/0229244 | A1 | 10/2005 | Khare et al. | |
| 2006/0150243 | A1* | 7/2006 | French | H04L 41/28 726/11 |
| 2006/0159025 | A1* | 7/2006 | Abdo | H04L 12/2602 370/249 |
| 2006/0168255 | A1* | 7/2006 | Katz | H04L 61/1523 709/229 |
| 2006/0185009 | A1* | 8/2006 | Kamine | H04L 29/12009 726/11 |
| 2006/0248588 | A1* | 11/2006 | Jayaraman | H04L 63/1458 726/22 |
| 2007/0160050 | A1* | 7/2007 | Wang | H04L 12/2697 370/392 |
| 2007/0192501 | A1* | 8/2007 | Kompella | H04L 43/50 709/230 |
| 2007/0271453 | A1* | 11/2007 | Pohja | H04L 63/029 713/153 |
| 2008/0031265 | A1* | 2/2008 | Mullick | H04L 12/2602 370/401 |
| 2009/0037713 | A1* | 2/2009 | Khalid | H04L 12/4633 713/1 |
| 2009/0073886 | A1* | 3/2009 | Burns | H04L 43/50 370/248 |
| 2009/0094691 | A1* | 4/2009 | Dargis | H04L 63/0236 726/11 |
| 2009/0234968 | A1* | 9/2009 | Thomas | H04L 65/4084 709/241 |
| 2009/0279673 | A1* | 11/2009 | Maffre | H04L 12/2697 379/1.03 |
| 2010/0154049 | A1* | 6/2010 | Yoshimi | H04L 63/20 726/13 |
| 2010/0183151 | A1* | 7/2010 | Wing | H04L 63/029 380/257 |
| 2010/0202450 | A1* | 8/2010 | Ansari | G06Q 30/04 370/389 |
| 2011/0023096 | A1* | 1/2011 | Xiao | H04L 63/0236 726/5 |
| 2011/0099623 | A1* | 4/2011 | Garrard | H04L 63/126 726/14 |
| 2011/0154473 | A1 | 6/2011 | Anderson et al. | |
| 2011/0252462 | A1* | 10/2011 | Bonanno | H04L 63/02 726/7 |
| 2011/0292879 | A1* | 12/2011 | Wang | H04W 60/005 370/328 |
| 2011/0320889 | A1* | 12/2011 | Balasubramanyan | G06F 11/0757 714/55 |
| 2011/0321148 | A1* | 12/2011 | Gluck | H04L 63/0209 726/9 |
| 2012/0260328 | A1* | 10/2012 | Ravindranath | H04L 61/2575 726/9 |
| 2013/0097692 | A1* | 4/2013 | Cooper | G06F 21/00 726/14 |
| 2013/0329595 | A1* | 12/2013 | Scholz | H04L 65/80 370/252 |
| 2014/0063102 | A1* | 3/2014 | Hirai | B41J 2/04581 347/14 |
| 2014/0189842 | A1* | 7/2014 | Wang | H04L 63/0807 726/9 |
| 2014/0208406 | A1* | 7/2014 | Austin | H04L 63/02 726/7 |
| 2015/0106526 | A1* | 4/2015 | Arndt | H04L 67/141 709/227 |
| 2015/0128212 | A1* | 5/2015 | Scott | H04L 41/0893 726/1 |
| 2015/0146567 | A1* | 5/2015 | Ylimartimo | H04L 63/0272 370/254 |
| 2015/0172103 | A1* | 6/2015 | DeCusatis | H04L 41/0681 370/389 |
| 2016/0006693 | A1* | 1/2016 | Salcedo | H04L 63/0236 726/1 |
| 2016/0142373 | A1* | 5/2016 | Ossipov | H04L 63/0236 713/171 |
| 2016/0182357 | A1* | 6/2016 | Martinsen | H04L 45/16 370/396 |
| 2017/0039372 | A1* | 2/2017 | Koval | G01D 4/004 |

FOREIGN PATENT DOCUMENTS

| | | |
|---|---|---|
| EP | 1833194 A1 | 9/2007 |
| WO | 2006045323 A1 | 5/2006 |

OTHER PUBLICATIONS

Wikipedia, "Ping (netwrok utility)", https://en.wikipedia.org/wiki/Ping_(networking_utility) ,Nov. 17, 2014, Wikipedia, 5 pages.*

Wikipedia, "Time to live", https://en.wikipedia.org/wiki/Time_to_live,Dec. 21, 2014, Wikipedia, 2 pages.*

Postel, "Internet Control Message Protocol—DARPA Internet Program Protocol Specification," RFC 792, Sep. 1981, 21 pages.

Conta, et al., "Internet Control Message Protocol (ICMPv6) for the Internet Protocol Version 6 (IPv6) Specification," RFC 4443, Mar. 2006, 24 pages.

Foreign Communication From a Counterpart Application, PCT Application No. PCT/CN2016/080902, International Search Report dated Jul. 21, 2016, 7 pages.

Foreign Communication From a Counterpart Application, PCT Application No. PCT/CN2016/080902, Written Opinion dated Jul. 21, 2016, 4 pages.

* cited by examiner

FIREWALL AUTHENTICATION OF CONTROLLER-GENERATED INTERNET CONTROL MESSAGE PROTOCOL (ICMP) ECHO REQUESTS

BACKGROUND

Network security is becoming increasingly important as the Internet is widely employed for modern communications, such as emails, content sharing, online purchases, and/or banking transactions. However, the Internet has also presented many opportunities for malicious communications or security attacks. A firewall is an example of a network security system that controls the incoming and/or the outgoing traffic of a network or a networking domain based on a set of applied rules. A firewall establishes a barrier between a trusted and secure internal network and another external network, for example, the Internet, that is assumed to be untrusted and unsecure. A firewall may be implemented as a software solution or as a hardware appliance. Some routers that transfer data between networks are integrated with firewall components. Conversely, some firewalls are integrated with basic routing functions.

SUMMARY

In one embodiment, the disclosure includes a method, implemented by a network firewall, by obtaining a first authentication token for a network test, receiving a test request message for performing the network test on a network element (NE) connected to the network firewall, authenticating the test request message by determining whether the test request message includes a second authentication token that matches the first authentication token, and granting the network test on the NE when the second authentication token matches the first authentication token.

In another embodiment, the disclosure includes a method, implemented by a network management entity, by exchanging an authentication token with a network firewall for performing a network test, generating a test request message for performing the network test on an NE that is connected to the network firewall, embedding the authentication token in the test request message, and sending the test request message containing the authentication token to the NE.

In yet another embodiment, the disclosure includes an NE connected to a network firewall, containing a receiver configured to couple to a network, a transmitter configured to couple to the network, and a processor coupled to the receiver and the transmitter, wherein the processor is configured to receive, via the receiver, a first test request message from a network management entity indicating a connectivity test request, wherein the first test request message includes an authentication token, forward the first test request message to the network firewall to request authentication of the authentication token by the network firewall, receive a second test request message from the network firewall when the authentication token of the first test request message is successfully authenticated, and send, via the transmitter, a test reply message to the network management entity after receiving the second test request message from the network firewall.

In another embodiment, the disclosure includes an apparatus comprising a receiver configured to receive a test request message for performing a network test on an NE connected to the apparatus, and a processor coupled to the receiver and configured to obtain a first authentication token for the network test, authenticate the test request message by determining whether the test request message comprises a second authentication token that matches the first authentication token, and grant the network test on the NE when the second authentication token matches the first authentication token.

In another embodiment, the disclosure includes an apparatus comprising a transmitter, a receiver, and a processor coupled to the transmitter and the receiver, wherein the processor is configured to exchange, via the transmitter and the receiver, an authentication token with a network firewall for performing a network test, embed the authentication token in a test request message for performing the network test on an NE that is connected to the network firewall, and send, via the transmitter, the test request message comprising the authentication token to the NE.

In another embodiment, the disclosure includes a method implemented by an NE connected to a network firewall, comprising receiving a first test request message from a network management entity indicating a connectivity test request, wherein the first test request message comprises an authentication token, forwarding the first test request message to the network firewall to request authentication of the authentication token by the network firewall, receiving a second test request message from the network firewall when the authentication token of the first test request message is successfully authenticated, and sending a test reply message to the network management entity after receiving the second test request message from the network firewall.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
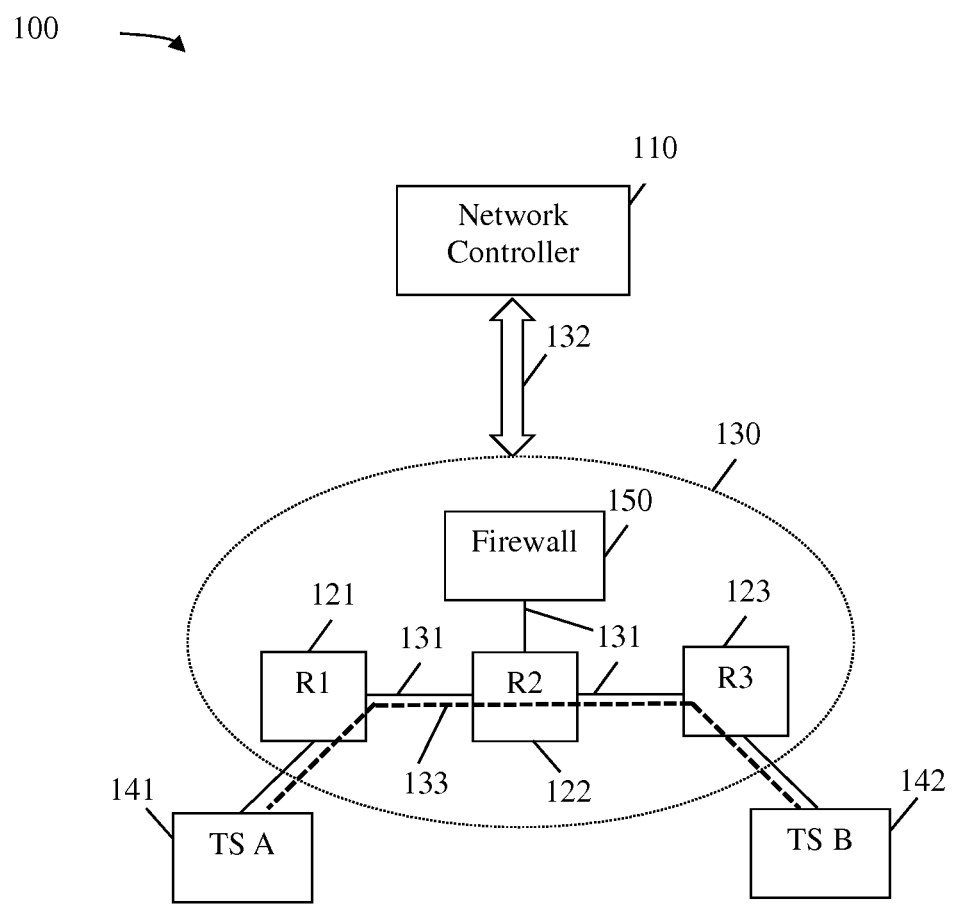
FIG. 1 is a schematic diagram of an embodiment of a network system.

It should be understood at the outset that although an illustrative implementation of one or more embodiments is provided below, the disclosed systems and/or methods may be implemented using any number of techniques, whether currently known or later developed. The disclosure should in no way be limited to the illustrative implementations, drawings, and techniques illustrated below, including the designs and implementations illustrated and described herein, but may be modified within the scope of the appended claims along with their full scope of equivalents.

ICMP is a protocol for reporting errors and other information regarding the processing of Internet protocol (IP) packets in an IP network. The ICMP for IP version 4 (IPv4) and IP version 6 (IPv6) are described in the Internet Engineering Task Force (IETF) documents Request For Comments (RFC) 792 and RFC 4443, respectively, which both are incorporated herein by reference. Network devices, such as routers, switches, gateways, and bridges, may employ the ICMP to send error messages, for example, indicating that a requested service is not available or reporting an unreachable host or router. Some example applications and/or utilities that are based on the ICMP include ping and traceroute. The ping utility and the traceroute utility are implemented using ICMP echo request messages and ICMP echo reply messages. The ping utility is employed to test the reachability or connectivity of a destination network device on an IP network. In addition, the ping utility may measure the roundtrip delay between an originating network device and a destination network device. The traceroute utility is employed to discover successive network devices between an originating network device and a destination network device. In addition, the traceroute utility may measure the packet transit delays between successive network devices. Many networks employ firewalls to improve the security of the networks. However, some firewalls may reject or block ICMP messages, causing the ping utility and/or the traceroute utility to report a failure.

Disclosed herein are mechanisms for authenticating a network test session between a network management entity or a network controller and a firewall. The disclosed authentication mechanisms enable a firewall to identify and accept (e.g., pass through) test request messages generated by an authenticated or trusted network controller and/or network management entity and to reject (e.g., filter out) test request messages generated by other untrusted entities. To establish an authenticated network test session, a network controller exchanges an authentication token (e.g., a 32-bit random number) with a firewall. The authentication token may be associated with an expiration time period after which the authentication token may become invalid. Subsequently, when the network controller sends test request messages to a network device connected to the firewall, the network controller embeds the exchanged authentication token in the test request messages such that the firewall may allow the test request messages to be passed to the network device. For example, when the network device receives a test request message from the network controller, the network device forwards the test request message to the firewall for authentication. The firewall authenticates the test request message by verifying that the exchanged authentication token is valid, for example, before the elapse of the expiration period, and the test request message includes an authentication token matched to the exchanged authentication token. After authenticating the test request message, the firewall forwards the test request message back to the network device. The network device may respond to the test request message by sending a test reply message to the network controller. In an embodiment, the network controller generates the authentication token during the exchange of authentication token. In another embodiment, the firewall generates the authentication token during the exchange of the authentication token. In an embodiment, the network test is a logical connectivity test that is based on ICMP echo request messages and ICMP echo reply messages. The disclosed embodiments provide mechanisms for extending the ICMP echo request message as defined by the IETF documents RFC 792 and RFC 4443 to include a firewall authentication token field. The disclosed embodiments are suitable for any networks, for example, a conventional IP network or a software-defined network (SDN). In a conventional IP network, the central network management entity may be an administrative entity, such as a network administrator, whereas in an SDN, the central network management entity may be an SDN controller.

FIG. 1 is a schematic diagram of an embodiment of a network system 100. The system 100 may be a data center (DC) network, a metropolitan area network (MAN), an SDN, or an enterprise wide area network (WAN). The system 100 includes a transport network 130 coupled to a network controller 110. The network 130 includes a plurality of network nodes 121, 122, and 123 (e.g., R1, R2, and R3) and a firewall 150 interconnected by a plurality of links 131. The network 130 may include a single networking domain or multiple networking domains. In an embodiment, the system 100 may be partitioned into multiple network domains and each network domain may be coupled to a network controller 110. In another embodiment, the system 100 may include a single network domain coupled to multiple network controllers 110. In yet another embodiment, the system 100 may include a single domain coupled to a single network controller 110. The links 131 may include physical links, such as fiber optic links, electrical links, logical links, or combinations thereof, used to transport data.

The network controller 110 may be a virtual machine (VM), a hypervisor, a distributed system including a plurality of computing devices, or any other device and/or system configured to manage the network 130. The network controller 110 may be a software agent operating on hardware and acting on behalf of a network provider that owns the network 130. The network controller 110 may perform various operation, administration, and management (OAM) operations to enable network operators and/or network providers to resolve network problems, monitor network performances, and perform network maintenance. For example, the network controller 110 monitors and verifies connectivity among the network nodes 121-123, traces the network nodes 121-123 in a particular network path across the network 130, detects and isolates connectivity faults in the links 131, and/or performs protection switching when detecting a faulty working link 131.

The network nodes 121-123 may be switches, routers, bridges, gateways, and/or any other network devices suitable for forwarding data in the network 130. The firewall 150 may be any device configured to connect to one or more of the network nodes 121-123, for example to protect tenant system (TSs) connected to network nodes 121-123. The firewall 150 may be implemented as a software component and/or a hardware component on a network device. As shown in the system 100, the firewall 150 is configured to protect a TS connected via the network node 122, for example, by controlling the incoming traffic destined to the network node 122 and/or the outgoing traffic sent from the network node 122 based on a set of pre-determined rules. For example, the firewall 150 may reject and discard certain types of data packets, such as ICMP packets, from the incoming traffic and/or the outgoing traffic. In some embodiments, the firewall 150 is a physical appliance, which may be referred to as a middle box, containing software and/or configurable hardware, such as field-programmable gate array (FPGA), configured to perform traffic filtering to prevent certain types of data traffic from passing through the network node 122. In some other embodiments, the firewall 150 is implemented as a component and/or unit integrated within the network node 122, which may be referred to as access control lists (ACLs).

The system 100 further includes a plurality of TS 141 and 142 (e.g., TS A and TS B). As shown in the system 100, the TS 141 is connected to the network 130 via the network node 121, and the TS 142 is connected to the network 130 via the network node 123. The TSs 141 and 142 may be physically located in different geographical locations. The TSs 141 and 142 may be network devices that are connected to tenant networks that are owned by a same entity and may utilize services provided by the system 100, for example, bandwidths for data transfer, network storages, and/or other network resources. The system 100 may be configured as shown or alternatively configured as determined by a person of ordinary skill in the art to achieve similar functionalities.

In an embodiment, the system 100 is implemented as an SDN by employing SDN techniques, where the control plane of the system 100 is decoupled from the forwarding plane of the system 100. The network controller 110 is configured to define and manage data flows that occur in the data plane of the network 130. The network controller 110 maintains a full topology view of the underlying infrastructure of the network 130, computes forwarding paths through the network 130, and configures the network nodes 121-123 along the forwarding paths with forwarding instructions. The forwarding instructions may include a next network node 121, 122, or 123 (a next hop node) in a data flow and/or flow processing functions for the data flow. The network controller 110 sends the forwarding instructions to the network nodes 121-123 via a control plane interface 132. The network nodes 121-123 are configured to receive the forwarding instructions from the network controller 110 via the control plane interface 132. The network nodes 121-123 may save the forwarding instructions, for example, in one or more flow tables or a forwarding information base (FIB). Based on the forwarding instructions, a network node 121-123 may forward an incoming packet to a next network node 121-123 or drop the packet. Alternatively, when receiving a packet from an unknown flow or a flow determined to be handled by the network controller 110, the network nodes 121-123 may forward the packet to the network controller 110. The network controller 110 may in turn determine a forwarding path for the packet.

The transportation of data across the network 130, for example through the network nodes 121-123, involves various network control and management operations. For example, the network controller 110 may test the connectivity among the network nodes 121-123 in the network 130, detect and isolate connectivity faults at the links 131, and/or provide alternative protection switching paths in the network 130 when a working link 131 is corrupted. One approach to testing network connectivity is to employ ICMP echo request and reply messages. For example, the network controller 100 sends an ICMP echo request message to a destined network node 121, 122, or 123, and the destined network node 121, 122, or 123 responds by sending an ICMP echo reply message.

In an embodiment, the system 100 implements network function virtualization (NFV) and service chaining, and the firewall 150 is configured to block ICMP packets. For example, a service chain is established between the TSs 141 and 142 via the network nodes 121-123 along a network path 133 (shown as dashed line), where the network node 122 is connected to the firewall 150. When the network node 122 is connected to the firewall 150, the firewall 150 filters traffic that may pass through the network node 122, for example, to protect a TS connected to the network 130 via the network node 122. The network path 133 includes a plurality of the links 131 that connect the network nodes 121-123. The network controller 110 may determine to test the network connectivity between the TSs 141 and 142 by sending ICMP echo request messages to the network nodes 121-123. However, the firewall 150 prevents the network node 122 from responding to the ICMP echo request message by blocking the ICMP echo request messages. Thus, the network connectivity test may not be completed successfully and may indicate a faulty connection while the connection along the network path 133 is working.

Figure 2:
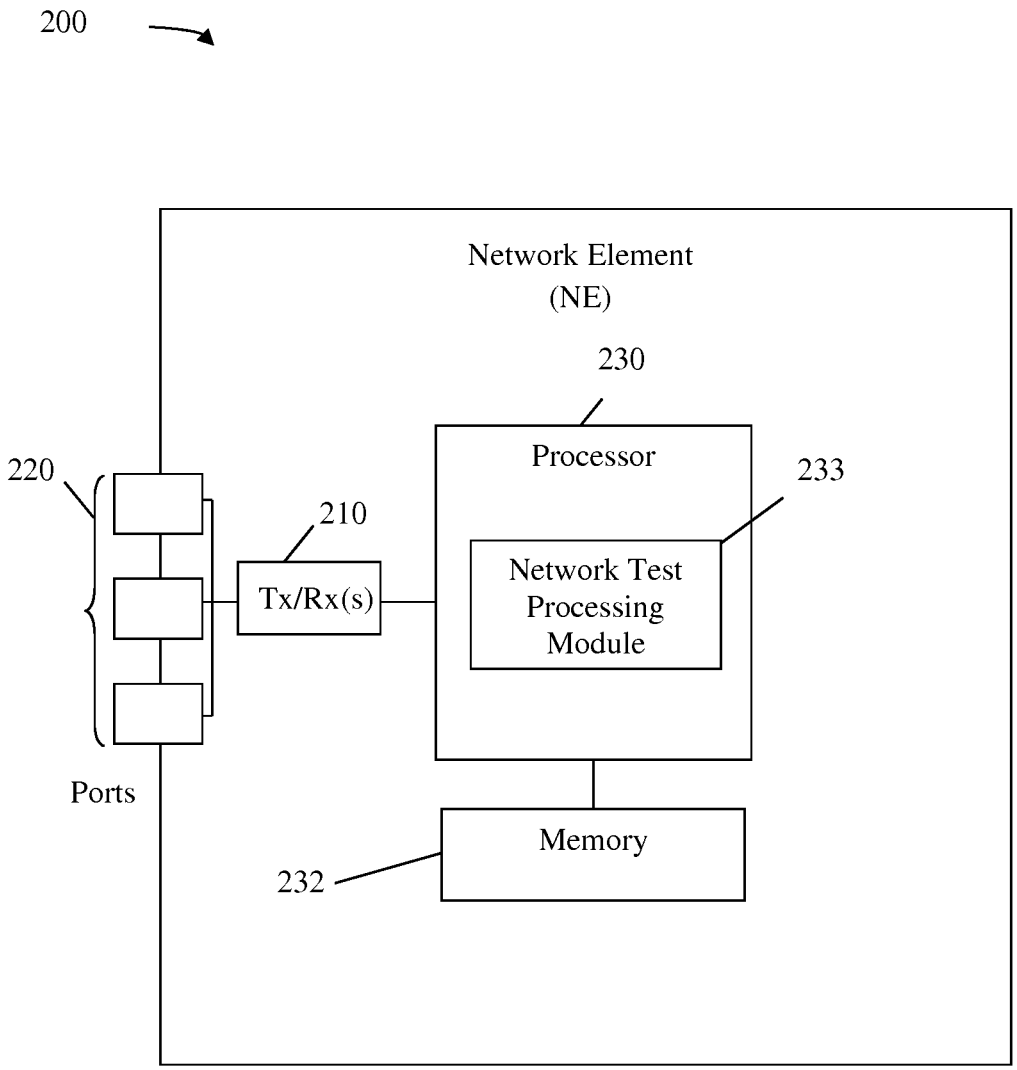
FIG. 2 is a schematic diagram of an embodiment of an NE within a network.

FIG. 2 is a schematic diagram of an example embodiment of an NE 200 within a network, such as the system 100. For instance, the NE 200 may be a router, a switch, a bridge, a gateway, and/or a network node, such as the network nodes 121-123 or the firewall 140, a network controller, such as the network controller 110, and/or any network devices or appliances in the network system. NE 200 may be configured to implement and/or support the network test and authentication mechanisms described herein. NE 200 may be implemented in a single node or the functionality of NE 200 may be implemented in a plurality of nodes. One skilled in the art will recognize that the term NE encompasses a broad range of devices of which NE 200 is merely an example. NE 200 is included for purposes of clarity of discussion, but is in no way meant to limit the application of the present disclosure to a particular NE embodiment or class of NE embodiments. At least some of the features and/or methods described in the disclosure may be implemented in a network apparatus or module such as an NE 200. For instance, the features and/or methods in the disclosure may be implemented using hardware, firmware, and/or software installed to run on hardware. As shown in FIG. 2, the NE 200 may include one or more transceivers (Tx/Rx) 210, which may be transmitters, receivers, or combinations thereof. The Tx/Rx 210 may be coupled to plurality of ports 220 for transmitting and/or receiving frames from other nodes. A processor 230 may be coupled to the Tx/Rx 210 to process the frames and/or to determine which nodes to send the frames to. The processor 230 may include one or more multi-core processors and/or memory devices 232, which may function as data stores, buffers, etc. Processor 230 may be implemented as a general processor or may be part of one or more application specific integrated circuits (ASICs) and/or digital signal processors (DSPs). Processor 230 may include a network test processing module 233, which may perform network test and/or authentication functions of a network controller 110, a firewall 150, or a network node 121, 122, or 123 and implement methods 300, 400, 500, 600, 700, 800, and/or 1000 as discussed more fully below. As such, the inclusion of the network test processing module 233 and associated methods and systems provides improvements to the network. In an alternative embodiment, the network test processing module 233 may be implemented as instructions stored in the memory devices 232, which may be executed by the processor 230. The memory device 232 may include a cache for temporarily storing content, e.g., a random-access memory (RAM). Additionally, the memory device 232 may include a long-term storage for storing content for relatively longer period, e.g., a read-only memory (ROM). For instance, the cache and the long-term storage may include dynamic RAMs (DRAMs), solid-state drives (SSDs), hard disks, or combinations thereof.

It is understood that by programming and/or loading executable instructions onto the NE 200, at least one of the processor 230 and/or memory device 232 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

As described above, many firewalls, such as the firewall 150, are configured to protect a private internal network from external networks by applying a set of packet filtering rules. The packet filtering rules are commonly designed to block ICMP messages. As such, the commonly used ping utility and/or traceroute utility, which are based on ICMP echo messages, may not be employed to test the connectivity of a network path that includes nodes connected to firewalls. One approach to overcoming the rejection or blocking of the ICMP echo request messages is to establish a trusted relationship between a network controller, such as the network controller 110, and a firewall, for example prior to performing a connectivity test, and to extend the ICMP protocol such that authentication information may be embedded in ICMP echo request messages. For example, a network controller may establish an authentication session with a firewall to exchange authentication information. Subsequently, the network controller may employ extended ICMP echo request messages embedded with the exchanged authentication information when testing against a node connected to the firewall. The extended ICMP echo request messages and the authentication information allow the firewall to differentiate ICMP echo messages sent by the network controller from other untrusted entities. For example, the firewall may pass the ICMP echo messages generated by the controller through to the node and reject the ICMP echo messages generated by the other untrusted entities.

Figure 3:
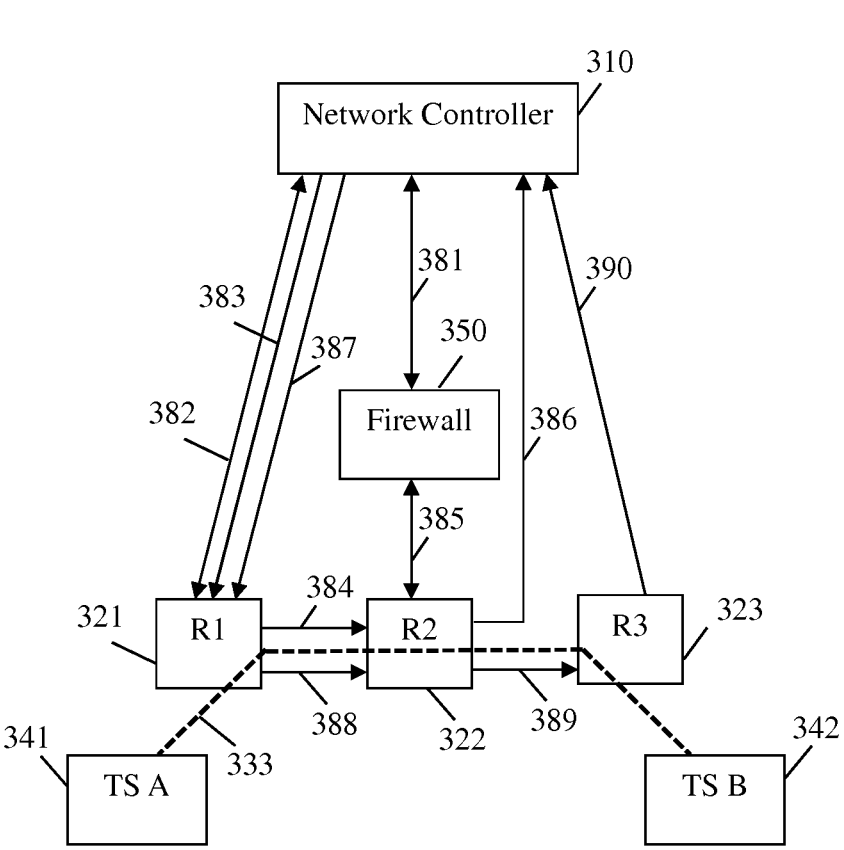
FIG. 3 is a schematic diagram of an embodiment of a network implementing a method for performing a secure network test.

FIG. 3 is a schematic diagram of an embodiment of a network implementing a method 300 for performing a secure network test. The network is similar to the system 100. For example, the network includes a network controller 310 similar to the network controller 110, a plurality of network nodes 321, 322, and 323 similar to the network nodes 121-123, a firewall 350 similar to the firewall 150, and a plurality of TSs 341 and 342 similar to the TSs 141-142. The network controller 310 is configured to control the plurality of network nodes 321-323. The network node 322 is connected to the firewall 350. The TSs 341 and 342 are connected via the network nodes 321-323 along a network path 333 (shown as dashed line) similar to the network path 133. The method 300 is implemented when the network controller determines to test the connectivity of a network path (e.g., the network path 333) between two nodes (e.g., the network nodes 321 and 323) and at least one of the nodes (e.g., the network node 322) along the network path is connected to a firewall (e.g., the firewall 350) that blocks ICMP echo messages. For example, to test the connectivity between the TS s 341 and 342, the network controller 310 may test the network path 333 between the network nodes 321 and 323, in which the network path 333 traverses through the network node 322 connected to the firewall 350.

At step 381, the network controller 310 establishes an authentication network test session with the firewall 350 and exchanges an authentication token with the firewall 350. The authentication token may be generated by the network controller 310 or the firewall 350, as discussed more fully below. The authentication token may be a self-invalidated token. For example, the authentication token may be assigned with an expiration time period, which indicates a time-to-live (TTL) value for the authentication token. The authentication token becomes invalid at the end of the expiration time period. The invalidation of the authentication token also invalidates and/or ends the authenticated network test session. For example, the expiration time period is about equivalent to the expected duration of the authenticated network test session. In an embodiment, the expiration time period is set to a sufficient duration to allow the completion of the network connectivity test between the network nodes 321 and 323.

At step 382, after establishing the authenticated network test session, the network controller 310 begins the network connectivity test by sending a first ICMP echo request message to the network node 321. The network controller may set the TTL value of the ICMP echo request message (e.g., in the IP header) to a value of one so that the network node 321 may respond with a first ICMP echo reply message.

At step 383, after receiving the first ICMP echo reply message, the network controller 310 sends a second ICMP echo request message destined to the network node 322 via the network node 321. The network controller 310 embeds the exchanged authentication token of step 381 in the second ICMP echo request message, as discussed more fully below. The network controller may set the TTL value of the second ICMP echo request message to a value of two (e.g., TTL=2) so that the second ICMP echo request message may reach the network node 322. At step 384, upon the reception of the second ICMP echo request message, the network node 321 decrements the TTL value of the second ICMP echo request message by one (e.g., TTL=1) and forwards the second ICMP echo request message to the network node 322.

At step 385, upon reception of the second ICMP echo request message, the network node 322 forwards the second ICMP echo request message to the firewall 350 for authentication. The firewall 350 authenticates the second ICMP echo request message by determining that the authentication token has not expired and the second ICMP echo request message carries an authentication token matched to the exchanged authentication token of step 381. After successfully authenticating the second ICMP echo request message, the firewall 350 forwards the second ICMP echo request message back to the network node 322. It should be noted that the network controller 310 does not consider the firewall 350 as a hop in the connectivity test, thus the firewall 350 may not decrement the TTL value of the second ICMP echo request message. At step 386, after the second ICMP echo request message is authenticated by the firewall 350, the network node 322 responds to the network controller 310 by sending a second ICMP echo reply message to the network controller 310.

At step 387, after receiving the second ICMP echo reply message, the network controller 310 sends a third ICMP echo request message destined to the network node 323 via the network node 321. The network controller may set the TTL value of the third ICMP echo request message to a value of three (e.g., TTL=3) so that the third ICMP echo request message may reach the network node 322. At step 388, upon receiving the third ICMP echo request message, the network node 321 decrements the TTL value of the third ICMP echo request message by one (e.g., TTL=2) and forwards the third ICMP echo request message to the network node 322. At step 389, upon receiving the third ICMP echo request message, the network node 322 further decrements the TTL value of the ICMP echo request message by one (e.g., TTL=1) and forwards the third ICMP echo request message to the network node 323. The third ICMP echo request message is not forwarded to the firewall 350 because the third ICMP echo request message is destined to the network node 323 and not the network node 322. At step 390, upon receiving the third ICMP echo request message, the network node 323 responds with a third ICMP echo reply message. It should be noted that the network controller 310 may configure the TTL value of an ICMP echo request message based on the number of hops between the network controller 310 and the destined network node 321, 322, or 323 under test. The ICMP echo request message may be dropped when the TTL value is zero or not forwarded when the TTL value is one. However, the firewall 350 is not considered as a hop in the network connectivity test as described above. It should also be noted that the first and third ICMP echo request messages may not include the authentication token of step 381.

Figure 4:
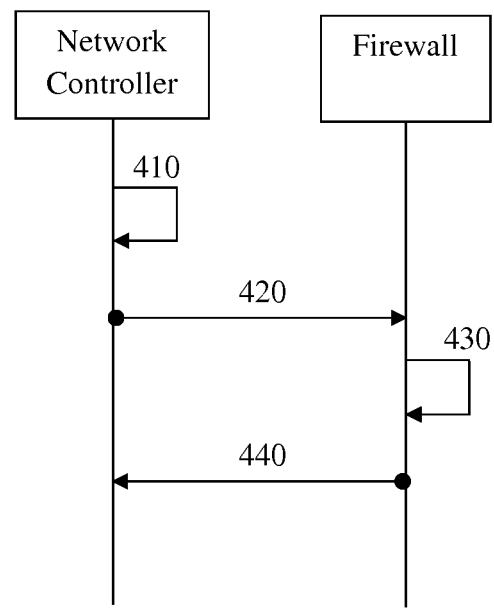
FIG. 4 is a protocol diagram of an embodiment of a method for establishing an authenticated network test session.

FIG. 4 is a protocol diagram of an embodiment of a method 400 for establishing an authenticated network test session. The method 400 is implemented between a network controller, such as the network controller 310, and a firewall, such as the firewall 350. The method 400 is implemented when a network controller determines to perform a test on a firewall-connected network node, such as the network node 322. At step 410, the network controller generates an authentication token for the network test, determines an expiration time period for the network test or the authentication token, and configures a TTL value for the authentication token based on the expiration time period. The authentication token may be a 32-bit random number or any other unique identifier suitable for identifying the authenticated network test session. At step 420, the network controller sends an authentication initiation message containing the authentication token and the expiration time period to the firewall to initiate an authenticated network test session. In some embodiments, the authentication initiation message may be an encrypted message. At step 430, upon receiving the authentication initiation message, the firewall saves the authentication token, configures a count-down counter or a timer with a period about equal to the expiration time period, and starts the counter or timer. At step 440, the firewall sends an authentication acknowledgement message to the network controller to confirm the establishment of the authenticated network test session.

Figure 5:
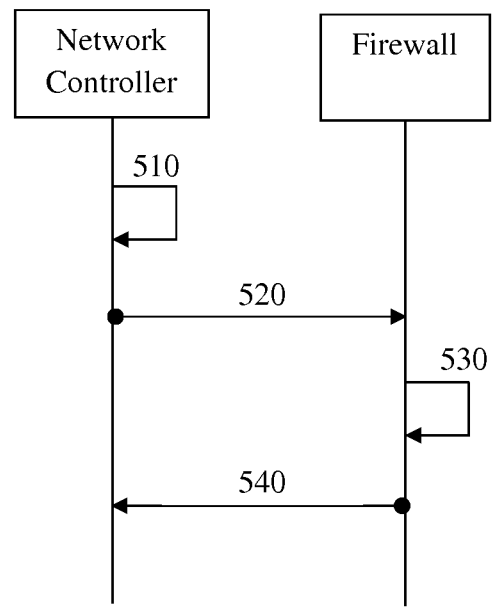
FIG. 5 is a protocol diagram of another embodiment of a method for establishing an authenticated network test session.

FIG. 5 is a protocol diagram of another embodiment of a method 500 for establishing an authenticated network test session. The method 500 is implemented between a network controller, such as the network controller 310, and a firewall, such as the firewall 350. The method 500 is implemented when a network controller determines to perform a test on a firewall-connected network node, such as the network node 322 at step 381. At step 510, the network controller determines an expiration time period for the network test. At step 520, the network controller sends an authentication initiation message including the expiration period to the firewall to initiate an authenticated network test session. At step 530, upon receiving the authentication initiation message, the firewall computes an authentication token, configures a count-down counter or a timer with a period about equal to the expiration time period, and starts the counter or timer. The authentication token may be a 32-bit random number or any other unique identifiers suitable for identifying the authentication session. At step 540, the firewall sends an authentication acknowledgement message containing the authentication token to the network controller to confirm the establishment of the authentication network test session.

Figure 6:
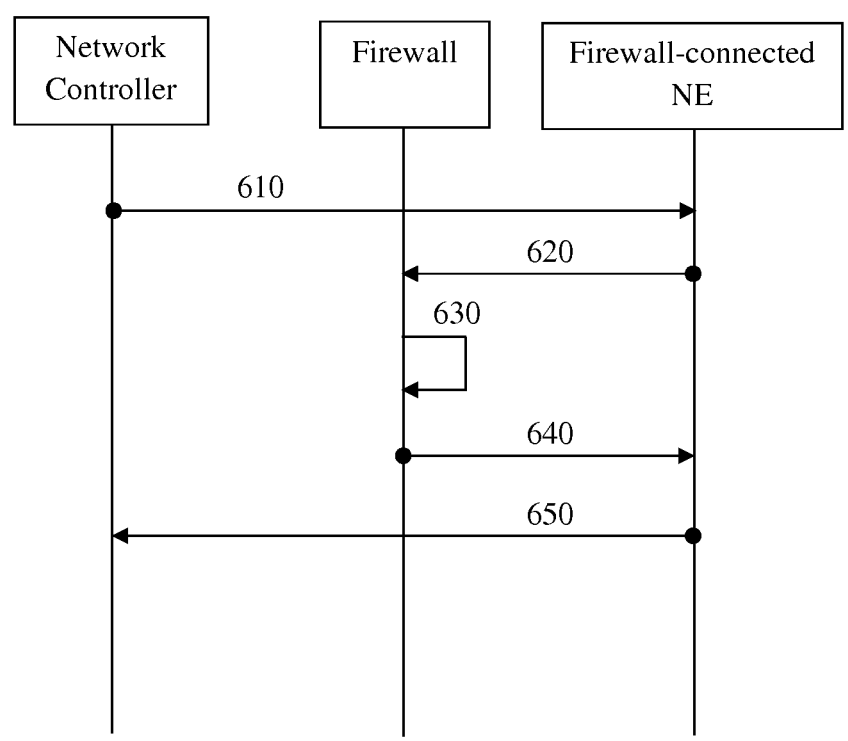
FIG. 6 is a protocol diagram of an embodiment of a method for performing a network test on a firewall-connected NE in an authenticated network test session.

FIG. 6 is a protocol diagram of an embodiment of a method 600 for performing a network test on a firewall-connected NE, such as the network node 322, in an authenticated network test session. The method 600 is implemented between a network controller, such as the network controller 310, a firewall, such as the firewall 350, and the firewall-connected NE. The method 600 employs substantially similar mechanisms as described in the method 300. The method 600 is implemented after an authenticated network test session is established, for example by employing methods 400 or 500. For example, an authentication token associated with an expiration time period is exchanged between the network controller and the firewall during the establishment of the authenticated network test session. At step 610, the network controller sends a test request message including the authentication token to the firewall-connected NE. At step 620, upon receiving the test request message, the firewall-connected NE forwards the test request message to the firewall. At step 630, upon receiving the network test request message forwarded by the firewall-connected NE, the firewall authenticates the network control request message. For example, the firewall first determines that the authentication token is valid by determining that the expiration time period has not elapsed. When the authentication token is valid, the firewall proceeds to determine that the test request message includes a firewall authentication token field. For example, a test request message that includes a firewall authentication token field may include a certain payload size. After determining that the test request message includes a firewall authentication token field, the network controller compares the value in the firewall authentication token field to the exchanged authentication token. If the firewall authentication token field value matches the exchanged authentication token, the firewall may allow the network test to proceed to step 640. Otherwise, the firewall may terminate the network test by dropping the test request message. At step 640, after successfully authenticating the test request message, the firewall forwards the test request message to the firewall-connected NE. At step 650, upon receiving the test request message authenticated by the firewall, the firewall-connected NE responds to the network controller by sending a network test reply message. In an embodiment, the network test is a network connectivity test, the test request message is an extended ICMP echo request message, as discussed more fully below, and the network test reply message is an ICMP echo reply message. It should be noted that in such an embodiment, the firewall preserves the TTL value of the extended ICMP echo request message when authenticating the ICMP echo request message, for example, at step 630.

Figure 7:
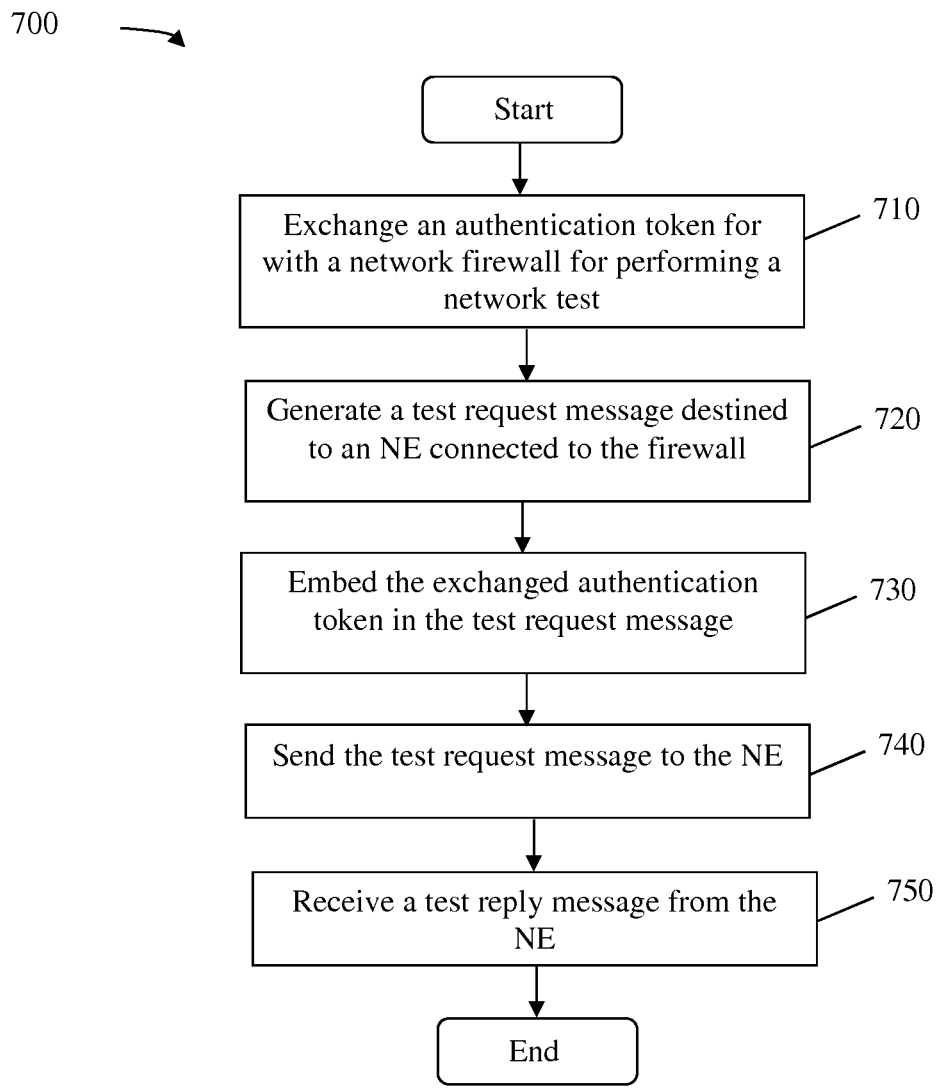
FIG. 7 is a flowchart of an embodiment of a method for performing a network test on a firewall-connected NE in an authenticated network test session.

FIG. 7 is a flowchart of an embodiment of a method 700 for performing a network test on a firewall-connected NE, such as the network node 322, in an authenticated network test session. The method 700 is implemented by a network controller, such as the network controller 310, a network administrator, an NE, such as the NE 200, or any network management node. The method 700 employs substantially the same mechanisms as described in the methods 300, 400, 500, and/or 600. The method 700 is implemented when the network controller performs a network test on the firewall-connected network node. At step 710, an authentication token is exchanged with a network firewall, such as the firewall 350, for performing a network test. For example, the authentication token may be exchanged by employing similar mechanisms as described in the method 400 or 500. At step 720, a test request message destined to an NE connected to the firewall is generated. The test request message is employed for performing the network test on the NE. At step 730, the exchanged authentication token is embedded in the test request message, for example, in a firewall authentication token field, as discussed more fully below. The embedding of the authentication token in the test request message allows the firewall to authenticate the test request message successfully and to allow the test request message to be passed through to the NE. At step 740, the test request message is sent to the NE. At step 750, a test reply message is received from the NE, where the test reply message is a response for the test request message sent at step 740. In an embodiment, the test request message is an extended ICMP echo request message, as discussed more fully below, and the test reply message is an ICMP echo reply message.

Figure 8:
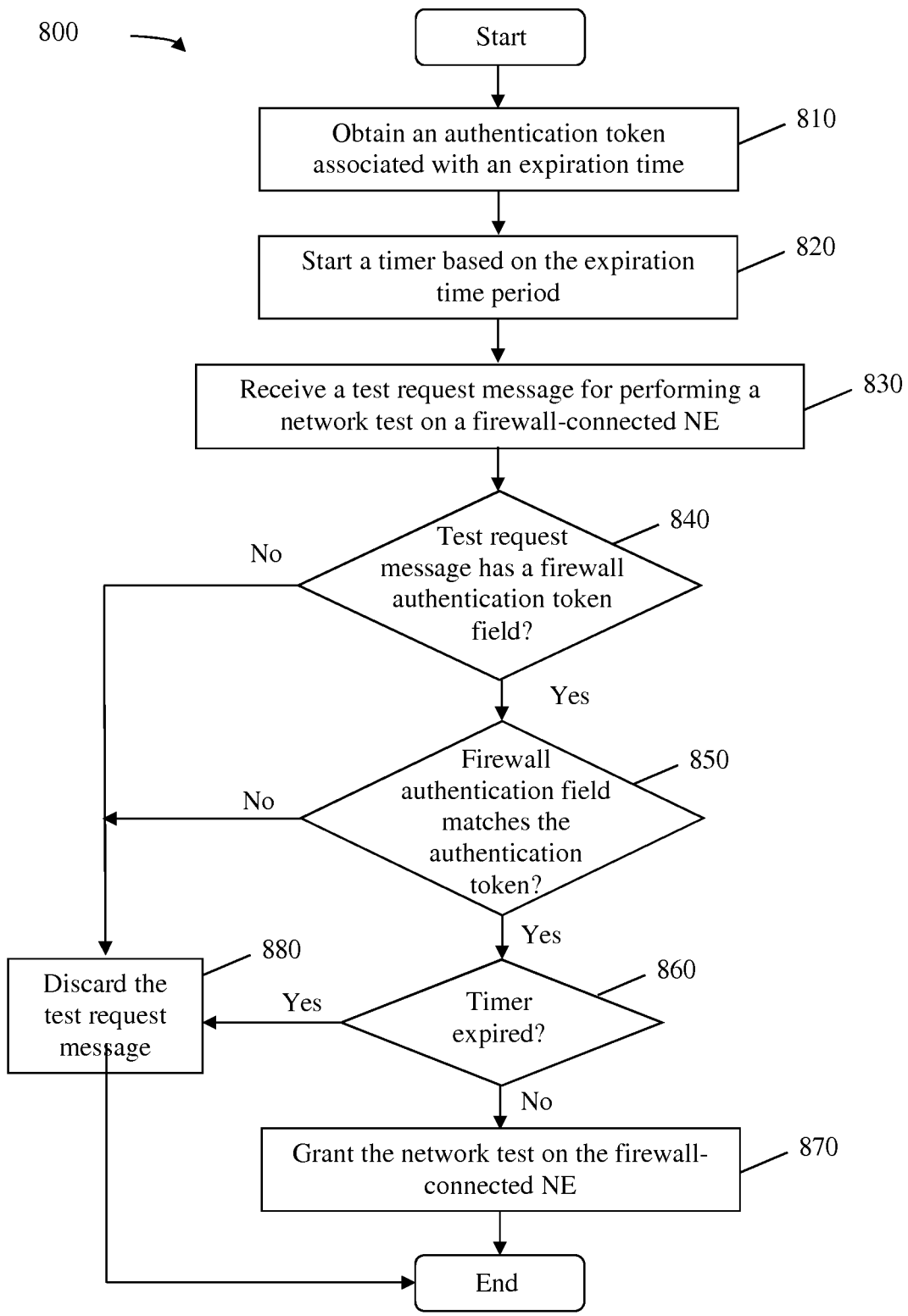
FIG. 8 is a flowchart of an embodiment of a method for authenticating a network test.

FIG. 8 is a flowchart of an embodiment of a method 800 for authenticating a network test. The method 800 is implemented by a firewall, such as the firewall 350, or an NE, such as the NE 200. For example, the firewall is configured to connect to an NE, such as the network nodes 121-123 and the NE 200, in a network, such as the system 100. The method 800 is implemented during an authenticated network test session. At step 810, an authentication token is obtained for the authenticated network test session, for example via the exchange of authentication initiation message and authentication acknowledgement message with a network controller as described in the method 400 or 500. The authentication token is associated with an expiration time period (e.g., a TTL value), where the authentication token becomes invalid or expired at the end of the expiration time period. At step 820, a timer is started based on the expiration time period. For example, the timer is a count-down counter and the timer is configured with a period about equal to the expiration time period and in association with the authentication token. At step 830, a test request message for performing a network test on the firewall-connected NE is received. For example, the test request message is initiated by the network controller and forwarded by the firewall-connected NE. At step 840, a determination is made whether the test request message includes a firewall authentication token field, for example, based on the length or size of the test request message. If the test request message does not include a firewall authentication token field (e.g., not an extended ICMP echo request message), next at step 880, the test request message is discarded. In an embodiment, when the test request message is an extended ICMP echo request message, the message may include a 64-bit payload, as discussed more fully below.

If the test request message includes a firewall authentication token field, next at step 850, a determination is made whether the firewall authentication token field has a value that matches the authentication token. If a match is not found, next at step 880, the test request message is discarded. If a match is found, next at step 860, a determination is made whether the timer corresponding to the authentication token has expired. If the timer is expired, next at step 880, the test request message is discarded. If the timer has not expired, next at step 870, the network test on the firewall-connected NE is granted, for example by forwarding the test request message back to the firewall-connected NE to enable the network test to proceed. It should be noted that the association between a particular timer and a particular authentication token may be implemented via an identifier or any other suitable mechanisms as determined by a person of ordinary skill in the art.

Figure 9:
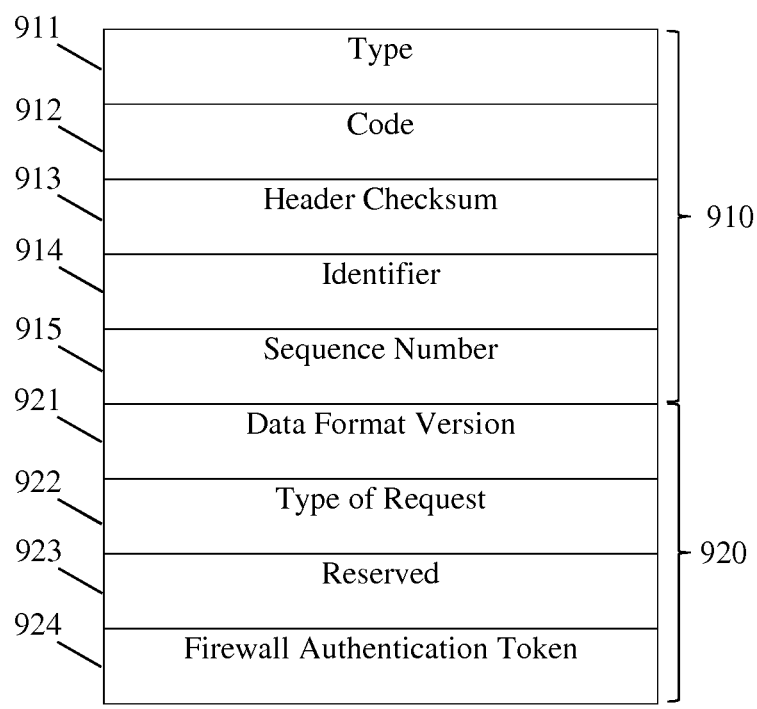
FIG. 9 is a schematic diagram of an embodiment of an extended Internet Control Message Protocol (ICMP) echo request packet.

FIG. 9 is a schematic diagram of an embodiment of an extended ICMP echo request packet 900. The packet 900 is part of an IP packet, which may be an IPv4 or IPv6 packet. The packet 900 is similar to the ICMP echo request packet defined by the ICMP, but extends the ICMP echo request packet to include an extension field for carrying authentication information. The packet 900 is employed by a network controller, such as the network controller 310, when performing a connectivity test on a network node, such as the network node 322, that is connected to a firewall, such as the firewall 350. For example, the methods 300, 400, 500, 600, and/or 700 may employ the packet 900 when sending a test request message destined to a firewall-connected NE in an authenticated network test session. The packet 900 includes a header 910 and a payload 920. The header 910 includes a type field 911, a code field 912, a header checksum field 913, an identifier field 914, and a sequence number field 915. The type field 911 has a length of about one byte and indicates the type of ICMP message carried in the packet 900. For example, the type field 911 is set to a value of eight to indicate that the packet 900 is an ICMP echo request packet. The code field 912 has a length of about one byte and indicates an ICMP subtype. For example, the code field 912 is set to a value of 0 for an ICMP echo request. The header checksum field 913 has a length of about two bytes and indicates a checksum value for the header 910. The identifier field 914 has a length of about two bytes and indicates an identifier for the packet 900. The sequence number field 915 has a length of about two bytes and indicates a sequence number. The identifier field 914 and the sequence number field 915 may be employed for matching an ICMP echo reply to the packet 900.

The payload 920 includes a data format version number field 921, a request type field 922, a reserved field 923, and a firewall authentication token field 924. The data format version number field 921 has a length of about one byte and indicates a data version number associated with the packet 900. For example, the data format version number field 921 may be employed for backward compatibility and may be configured to a value of about one to indicate that the payload 920 carries a first version of the extension. The request type field 922 has a length of about one byte and indicates the type of information requested by the packet 900. For example, the request type field 922 may indicate a request for virtual routing and forwarding (VRF) configuration data. The reserved field 923 has a length of about two bytes and may be reserved for future use. The firewall authentication token field 924 has a length of about four bytes and indicates an authentication token value. For example, the network controller may embed an authentication token (e.g., exchanged with a firewall) in the firewall authentication token field 924 when the packet 900 is destined to an NE connected to the firewall such that the firewall may allow the packet 900 to pass through to the firewall-connected NE. As shown in the packet 900, the payload 920 has a length of about 64 bits. As such, a payload size of about 64 bits may indicate the ICMP echo request packet is an extended ICMP echo request packet. It should be noted that the payload 920 may be configured as shown or alternatively configured as determined by a person of ordinary skill in the art to achieve the same functionalities. In some embodiments, the payload 920 includes additional data, such as packet delays, round-trip delays, etc., following the firewall authentication token field 924. In such embodiments, the payload size may be adjusted accordingly or other mechanisms may be employed for determining whether the packet 900 is an extended ICMP echo request packet.

Figure 10:
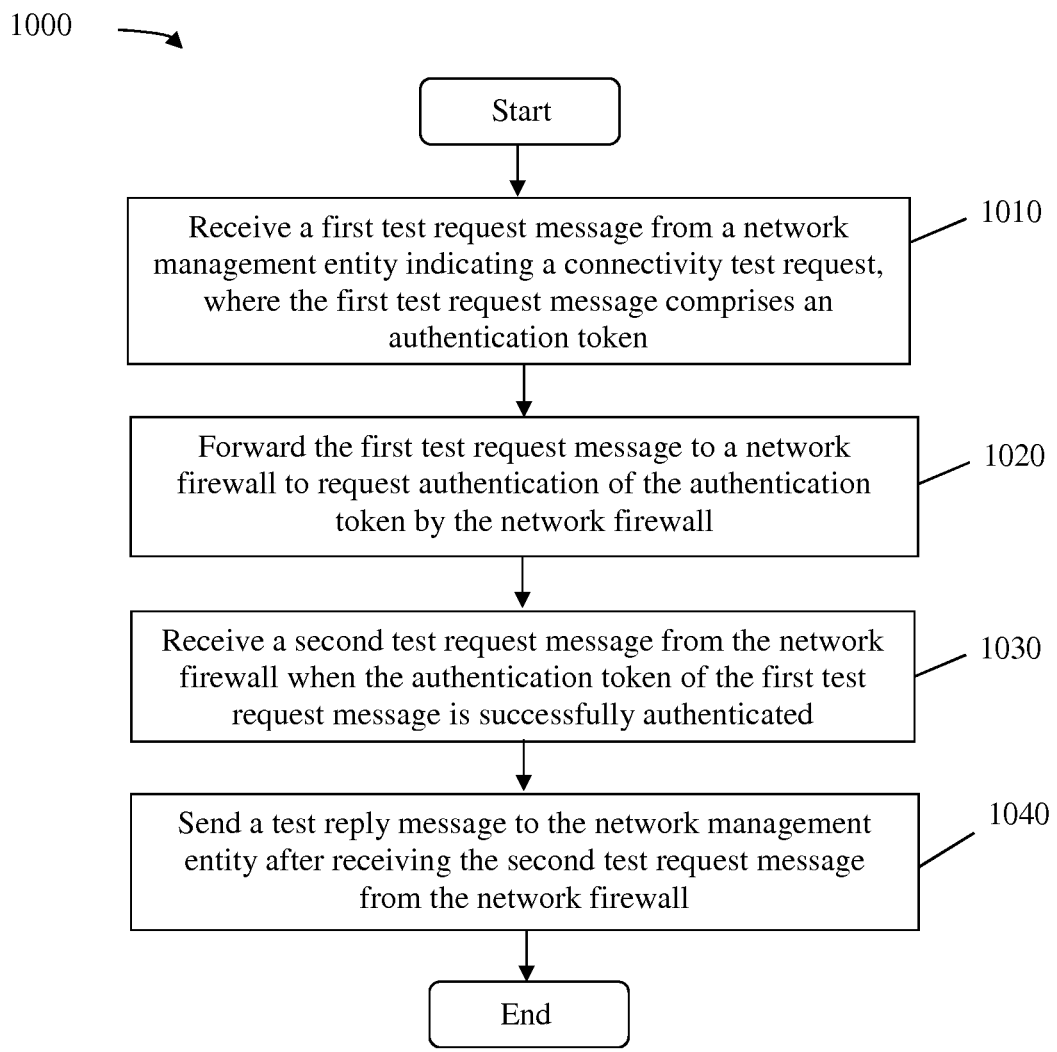
FIG. 10 is a flowchart of an embodiment of a method for responding to network test in an authenticated network test session.

FIG. 10 is a flowchart of an embodiment of a method 1000 for responding to a network test in an authenticated network test session. The method 1000 is implemented by an NE, such as the network node 322 or the NE 200, connected to a firewall, such as the firewall 350. The method 1000 is implemented after an authentication token is exchanged between the firewall and a network management entity, such as the network controller 310, for example, by employing mechanisms described in the methods 300, 400, 500, 700, and 800. The method 1000 is similar to the method 600. At step 1010, a first test request message is received from a network management entity indicating a connectivity test request, where the first test request message comprises an authentication token. At step 1020, the first test request message is forwarded to a network firewall to request authentication of the authentication token by the network firewall. At step 1030, a second test request message is received from the network firewall when the authentication token of the first test request message is successfully authenticated. At step 1040, a test reply message is sent to the network management entity after receiving the second test request message from the network firewall.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by a network firewall connected to a first network node, the method comprising:
   obtaining, by the network firewall from a network controller, a first network test session authentication token for a network test;
   receiving, by the network firewall, an Internet Control Message Protocol (ICMP) echo request message from a second network node for performing the network test on the first network node, the ICMP echo request message being an extended ICMP echo request packet comprising:
      a data format version number field indicating a version number for the extended ICMP echo request packet;
      a type of request field indicating a type of information requested by the extended ICMP echo request packet; and
      a firewall authentication token field identifying a firewall authentication token for the network test, and comprising a second network test session authentication token;
   comparing, by the network firewall, the second network test session authentication token to the first network test session authentication token;
   authenticating, by the network firewall, the ICMP echo request message in response to the second network test session authentication token in the ICMP echo request message matching the first network test session authentication token; and
   forwarding, by the network firewall, the ICMP echo request message to the first network node to grant the network test on the first network node.

2. The method of claim 1, further comprising:
   obtaining, by the network firewall from the network controller, a third network test session authentication token for a second network test;
   receiving, by the network firewall, a second ICMP echo request message from the second network node for performing the network test on the first network node, the second ICMP echo request message comprising a fourth network test session authentication token;
   comparing, by the network firewall, the fourth network test session authentication token to the third network test session authentication token; and
   rejecting the second ICMP echo request message in response to the fourth network test session authentication token failing to match the third network test session authentication token.

3. The method of claim 1, further comprising receiving an authentication initiation message from a network management entity via a network, wherein the authentication initiation message specifies a value corresponding to an expiration time period associated with the first network test session authentication token.

4. The method of claim 3, wherein the authentication initiation message further comprises the first network test session authentication token, and wherein the first network test session authentication token is obtained from the authentication initiation message.

5. The method of claim 3, wherein obtaining the first network test session authentication token for the network test comprises generating the first network test session authentication token in response to the authentication initiation message, and wherein the method further comprises sending an authentication acknowledgement message to the network management entity indicating the first network test session authentication token.

6. The method of claim 3, further comprising determining that the first network test session authentication token is associated with an unexpired expiration time period prior to authenticating the ICMP echo request message.

7. The method of claim 3, wherein the network is a software-defined network (SDN), and wherein the network management entity is an SDN controller.

8. The method of claim 1, wherein the first network test session authentication token comprises a 32-bit random number.

9. The method of claim 1, wherein forwarding the ICMP echo request message to the first network node comprises forwarding the ICMP echo request message to the first network node without modifying the ICMP echo request message.

10. A method implemented by a network management entity, the method comprising:
    exchanging, by the network management entity, a first network test session authentication token with a network firewall for authenticating an Internet Control Message Protocol (ICMP) echo request message;
    generating, by the network management entity, the ICMP echo request message for performing a network test on a first network node that is connected to the network firewall, the ICMP echo request message being an extended ICMP echo request packet comprising:
        a data format version number field indicating a version number for the extended ICMP echo request packet;
        a type of request field indicating a type of information requested by the extended ICMP echo request packet; and
        a firewall authentication token field identifying a firewall authentication token for the network test, and comprising a second network test session authentication token;
    sending, by the network management entity, the ICMP echo request message comprising the second network test session authentication token to the first network node via a second network node; and
    receiving, by the network management entity from the first network node, an ICMP echo reply message, indicating the network firewall matched the first and second network test session authentication tokens to authenticate the ICMP echo request message and grant the network test on the first network node.

11. The method of claim 10, wherein exchanging the first network test session authentication token with the network firewall comprises:
    sending an authentication initiation message to the network firewall to establish an authenticated network test session for performing the network test; and
    receiving an authentication acknowledgement message comprising the first network test session authentication token from the network firewall.

12. The method of claim 10, wherein exchanging the first network test session authentication token with the network firewall comprises:
    generating the first network test session authentication token; and
    sending an authentication initiation message to the network firewall to establish an authenticated network test session for performing the network test, wherein the authentication initiation message indicates the first network test session authentication token.

13. The method of claim 10, further comprising sending an authentication initiation message to the network firewall to establish an authenticated network test session for performing the network test, wherein the authentication initiation message indicates a time-to-live (TTL) value for the first network test session authentication token, and wherein the TTL value indicates a time duration in which the first network test session authentication token is valid.

14. The method of claim 10, wherein the ICMP echo request message is an extended ICMP echo request packet comprising a firewall authentication token field, and wherein embedding the second network test session authentication token in the ICMP echo request message comprises embedding the second network test session authentication token in the firewall authentication token field.

15. The method of claim 10, wherein the network management entity is a software-defined network (SDN) controller.

16. A network firewall connected to a first network node, the network firewall comprising:
    a non-transitory memory storage comprising instructions; and
    one or more processors in communication with the non-transitory memory storage, wherein the one or more processors execute the instructions to:
        obtain, from a network controller, a first network test session authentication token for a network test;
        receive an Internet Control Message Protocol (ICMP) echo request message from a second network node for performing the network test on the first network node, the ICMP echo request message being an extended ICMP echo request packet comprising:
            a data format version number field indicating a version number for the extended ICMP echo request packet;
            a type of request field indicating a type of information requested by the extended ICMP echo request packet; and
            a firewall authentication token field identifying a firewall authentication token for the network test, and comprising a second network test session authentication token;
        compare the second network test session authentication token to the first network test session authentication token;
        authenticate the ICMP echo request message in response to the second network test session authentication token in the ICMP echo request message matching the first network test session authentication token; and
        forward the ICMP echo request message to the first network node to grant the network test on the first network node.

17. The network firewall of claim 16, wherein the one or more processors execute the instructions to receive an authentication initiation message from a network management entity via a network, wherein the authentication initiation message specifies a value corresponding to an expiration time period associated with the first network test session authentication token.

18. The network firewall of claim 17, wherein the one or more processors execute the instructions to determine that the first network test session authentication token is associated with an unexpired expiration time period prior to authenticating the ICMP echo request message.

19. The network firewall of claim 16, wherein the instructions to forward the ICMP echo request message to the first network node comprise instructions to forward the ICMP echo request message to the first network node without modifying the ICMP echo request message.

20. The network firewall of claim 16, wherein the instructions to receive the ICMP echo request message from the second network node comprise instructions to receive the ICMP echo request message from the second network node via the first network node.

21. The method of claim 1, wherein receiving the ICMP echo request message from the second network node comprises receiving the ICMP echo request message from the second network node via the first network node.

\* \* \* \* \*